Feb. 16, 1965     B. H. VAN HORNE ETAL     3,169,820
TREND DETECTOR
Filed May 17, 1963                         2 Sheets-Sheet 1

INVENTORS.
Beverley H. Van Horne
Manson Keith Detwiler
Myron P. Zimmermann
BY
Griswold & Burdick
ATTORNEYS INVENTORS.
Beverley H. Van Horne
Manson Keith Detwiler
Myron P. Zimmermann BY Griswold & Burdick

ATTORNEYS

United States Patent Office 3,169,820
Patented Feb. 16, 1965

3,169,820
TREND DETECTOR
Beverley H. Van Horne, Manson Keith Detwiler, and Myron P. Zimmermann, Midland, Mich., assignors to The Dow Chemical Company, Midland, Mich., a corporation of Delaware
Filed May 17, 1963, Ser. No. 281,105
4 Claims. (Cl. 346—35)

This invention relates to a trend detector and more particularly to a machine for and method of detecting a change in the trend of a curve traced on the chart of a recording instrument.

This invention is a useful improvement or addition to conventional expanded scale or range indicating or controlling line recorder-type instruments such as that disclosed in U.S. Letters Patent 2,673,136. It finds particular utility as a means of controlling applied pressures in the method of non-destructive hydrostatic testing of pressure vessels which is disclosed in a copending application entitled "Nondestructive Testing of Pressure Vessels," by Donaldson and Van Horne, Serial No. 59,748, filed September 30, 1960.

In this particular application, a test assembly as shown schematically in FIGURE 6 herein can be used to carry out the method. In the test, the change (increase) in volume $\Delta V$ of fluid delivered to a fluid-filled vessel undergoing pressure test is related to the resulting change in pressure $\Delta P$ therein. The value of $$\frac{\Delta V}{\Delta P}$$

thus observed is linear for a test vessel expanding within its elastic limit. This relationship, therefore, is recorded as a straight line as the impulses from the pressure detecting gage affixed to the vessel undergoing test are translated into electrical signals and subsequently into a line by a conventional line recorder.

However, in this method of testing, as the yield point of the vessel is reached, the slope of the line changes. Continuing the test beyond this point will yield a curve of increased slope indicating that the elastic limit of the vessel has been exceded and that the vessel now is undergoing plastic deformation.

As the operator sees the trend of the curve deviating from a straight line, he can stop the pressure pump and end the test before damage is done.

Until now, the method of detecting changes in trends used in making tests of the above-described type included visual inspection of slope of the curves drawn by the chart pen to ascertain if the slope was changing, or by means of photoelectric trend indicators. The first method is inaccurate for observing small changes in trend and the second method is complex and expensive. The apparatus and method of this invention thus supply an accurate, simple and inexpensive means and method for detecting trends or small changes in trends during the non-destructive hydrostatic testing of pressure vessels.

In addition, by means of this trend indicator method, peculiarities or deviations from normal operation of the pressurizing system which become evident to the recorder such as pump leakage, the pushing out of dimples and indentations in a given test vessel during the test and the like also would be indicated by the trend detector.

It is a principal object of the present invention to provide an improved means for and method of detecting a change in the trend or slope of a recorder line by mechanical means.

It is another object of the present invention to provide an improved means for controlling a process or system, wherein operating conditions are depicted by a curve or series of curves, drawn by a recorder or similar instrument, using manual detection of a change in the trend or slope of the curve to indicate that the system should be shut off.

It is a further object of the present invention to provide a means for manually indicating the time at which pressure vessel tests conducted using the non-destructive hydrostatic method of testing disclosed in the above mentioned copending application Serial No. 59,748, filed September 30, 1960, should be terminated.

These and other objects and advantages will be apparent from reading the detailed description presented hereinafter in conjunction with the accompanying drawings, in which.

Figure 1:
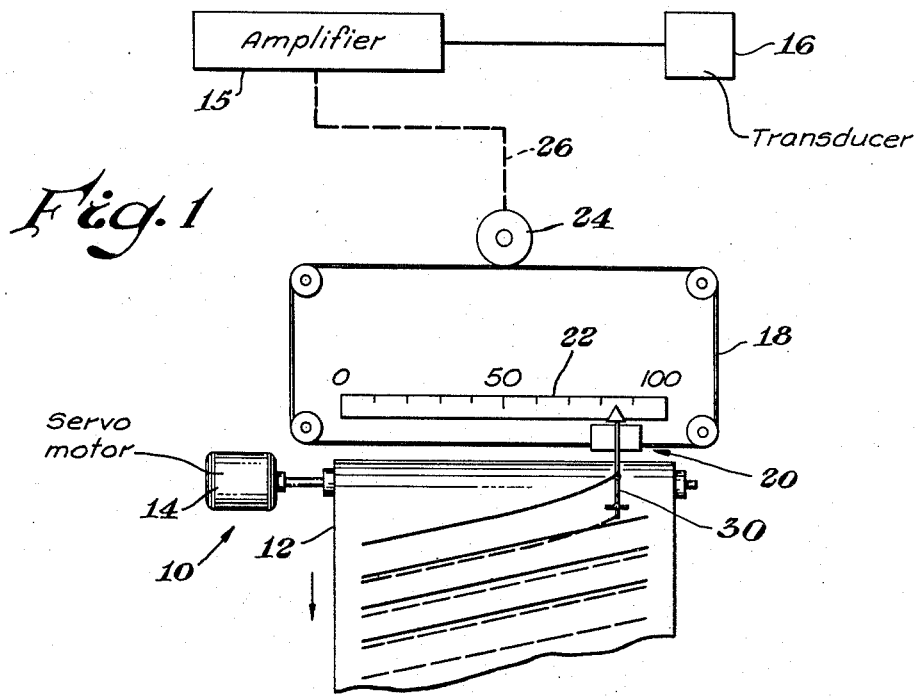
FIGURE 1 shows schematically trend detector apparatus in accordance with this invention.

The term "expanded scale-type recorder," used herein, refers to a recorder wherein rate of chart movement is a function of one variable and rate of pen movement is a function of a second variable and wherein the entire range to be measured is divided into consecutive segments which can be graphically illustrated on the moving chart by a number of successive traces, each representing one of the segments of the entire range being measured and each being located one below the other, at a pretermined distance from each other as shown in the drawing, or beside one another, e.g., in the case where the chart moves horizontally, and wherein each of the recording pen's traces on the chart starts from a predetermined position on one side of the chart and ends at a predetermined position on the other side.

The term "first pen," used hereinafter, refers to a sole moving recording pen found in conventional single pen-type recorders wherein the pen movement is at right angles to chart movement.

The term "second pen," used hereinafter, refers to the second pen attached to the first pen in such a manner as to be capable of drawing a curve simultaneously with and having the same configuration as the curve drawn by the first pen.

In general, the instant invention is a mechanical device for and method of detecting a change in the trend of a curve drawn by a moving pen whose rate of movement is a function of a variable to be measured on a moving chart and whose rate of advancement is correlated to a second variable. A second pen assembly is coupled to the pen driving assembly of said recorder which drives the previously-mentioned moving pen cyclically back and forth across said chart in such a manner that when said first pen assembly moves, it carries along with it the second pen assembly. The second pen draws a curve identical to, parallel to and simultaneously with the curve drawn by the first pen, but at a set predetermined distance from the curve of the first pen. Each of said pens draws curves which start at a predetermined position, usually an indexing or base line position, on the chart and finish at a predetermined position, and then move back to the initial predetermined position and resume drawing the normally repetitive lines or curves which occur, for example, in the previously-mentioned pressure testing method, until such time as the walls of the vessel under test exceed their elastic limit. The curve drawn by the second pen is spaced along the chart a distance which is at least approximately equal to the distance between the indexing points of two successive curves drawn by the first pen. The next successive line or curve drawn by the second pen therefore lies on or closely adjacent to the last line drawn by the first pen. Thus, with the two successive curves or lines disposed side by side (or superimposed), any change in trend of one line with respect to the other may easily be observed.

Referring now to the figures wherein like numerals represent like parts in the several views, in the trend indicator embodiment shown in FIGURES 1–5, an expanded scale-type recorder, indicated generally by number 10, has a movable chart 12 driven at a constant speed by a servomotor 14 which is responsive to a variable which is increasing a constant amount per unit of time. An amplifier 15 is connected to transducer means 16 which in turn is coupled as by a flexible cord 18 to a first pen assembly indicated generally by numeral 20 movable with respect to a stationary scale 22. The driving cord 18 for pen assembly 20 is driven by pulley 24 suitably coupled to shaft 26.

An elongated member indicated generally by numeral 30 comprised of two spaced parallel bars 32 having its sides disposed parallel to one another and joined together at both ends (see FIG. 2), and having a hook-like member 34 at its upper end, is attached to the first pen assembly 20 of an expanded scale-type recorder by means of said hook-type member 34 being hooked onto and held in place by a clip-like member 38 located on said first pen assembly. A second pen assembly 40 is soldered to a mounting block 42. An ink supply source 44 for said second pen is then suitably attached to the mounting block 42 by means of screws 46. A rectangular bar 48 having a width equal to the space between said two parallel bars 32 of said elongated member is attached to the mounting block 42 by means of rivets 50. The mounting block having thereon said second pen along with its ink supply source is then placed on said elongated member in such a manner that said bar 48 is disposed in the space between said two spaced parallel bars which define a path up and down between said parallel bars, and is slidably attached to said elongated member by clamp-like means which consist of plate 52 and screw 54, as shown. Thus, the position of the second pen may be manually adjusted along said elongated bar so as to be capable of being positioned at a predetermined distance from said pen. The first pen assembly, by means of bar 56 attached to said first pen assembly and positioned behind said elongated member, as shown, is adapted to lift the second pen tip off the chart when the first pen tip is lifted off the chart.

In carrying out the method of the instant invention, the second pen assembly 40 is affixed to the first pen assembly 20 of an expanded scale-type recorder 10 in such a manner so as to allow the tip 58 of the second pen assembly to be in a straight line with the tip 60 of the first pen assembly, both pens having their tips 58 and 60, respectively, on the chart during a writing cycle.

When the first pen assembly is activated and begins to move, it will carry the second pen assembly along with it, thus allowing the second pen to simultaneously trace a curve which is identical with and parallel to the curve traced by the first pen.

When the first pen and second pen have moved across the chart and have reached a predetermined position thereon, the first pen tip is automatically lifted off the face of the chart simultaneously with the second pen tip and both pens then move back to a predetermined starting position (at the other end of the chart) and resume their tracing. This procedure is repeated until the recorder is shut off.

The second pen is manually positioned up and down between the elongated member to which it is attached so that the curve drawn by it is in close proximity to the last previous curve drawn by the first pen. Thus, by following the trend of the present segment of the curve drawn by the second pen which has the same configuration as the present curve drawn by the first pen and comparing it to the trend or configuration of the last previous segment of the curve drawn by the first pen, a deviation in trend is easily observed between the present segment of the curve drawn by the first pen and the last previous segment of the curve drawn by the first pen. This is illustrated in the chart in FIGURE 1 wherein the solid line represents the curve made by the first pen and the dashed line represents the curve made by the second pen.

The method of this invention may be used for detecting a change in the trend of a trace made by a pen on a moving chart, i.e., the pen moves in one direction at a speed which is proportional to one variable and the chart moves at right angles to the direction of the pen movement at a speed which is proportional to a second variable. This latter system may or may not be incorporated into a recording instrument.

The recording pens and the ink source attached thereto are of standard construction.

In operation, the expanded scale recorder has therein a moving chart whose rate of movement is proportional to a first variable being measured. The first pen and the second pen of said recorder move at a rate proportional to a second variable being measured. Practically speaking, it would be of advantage to use the instant invention with a recorder wherein the amount of increase per unit time of one of the two variables being measured is a constant and when this constant changes to another constant, the second variable will change a proportionate amount. Thus, the trend will continue so long as the rate of the second variable is constant. However, as soon as the rate of the second variable deviates, the trend drawn on the chart will deviate from the configuration of the last previous curve drawn by the first pen. It will then be obvious as to which of the two variables' rate is changing since one of the variables' rate remains constant.

The type of pen points used in conjunction with the reference pen may be varied. If the recording is to be photographed in black and white, it would be well to use a conventional point used to trace out dashed curves so that the reader may easily recognize the curve drawn by the first pen and distinguish it from the curve drawn by the second pen. A double point on a single pen may be used for the same purpose. The double point may trace out two closely spaced parallel curves, both of which could be located on the same side of and in close proximity to the last previous curve drawn by the first pen, or it may trace out two parallel curves, one on either side of the last previous curve drawn by the first pen. The latter double-type pen provides a most effective visual means in detecting trend deviations. If colored photographs are to be taken of the recording or if no photographs at all are expected to be taken, then a second pen using a different colored ink than is used by the first pen will provide excellent means for distinguishing the traces of the first pen from the second pen.

The following example will serve to illustrate further the method of the instant invention but is not meant to limit it thereto.

*Example*

Figure 6:
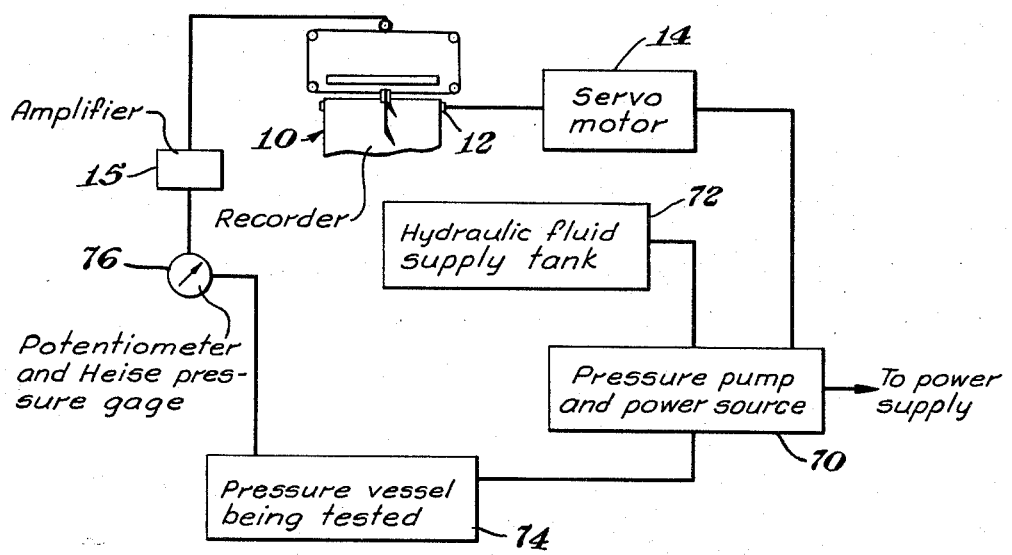
FIGURE 6 shows schematically the use of the dual pen assembly shown in FIGURES 2 and 3 as applied in a non-destructive hydrostatic method for testing pressure vessels.

A testing assembly is prepared as shown schematically in FIG. 6. This assembly utilizes a positive displacement piston-type constant delivery pump 70. The pump was connected to a fluid supply source 72 (water) which, in in turn, was coupled to a 6 inch pipe, A53 Grade B, O.D.=6.482 inches, 4 feet long, wall range 0.169 to 0.179 inch, to be pressure tested, designated by numeral 74.

A Heise Gage with microtorque potentiometer 76 also was attached to the vessel. The potentiometer, in turn, was coupled through an amplifier 15 to an expanded scale-type recorder, indicated generally by numeral 10. A servomotor 14 is connected to both the chart 12 of said recorder and to the pressure pump 70.

Figure 2:
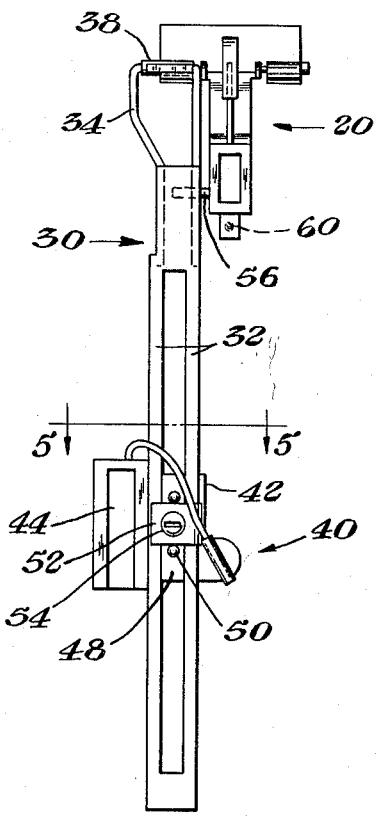
FIGURE 2 is a front elevation of one embodiment of a dual pen assembly in accordance with this invention.
Figure 3:
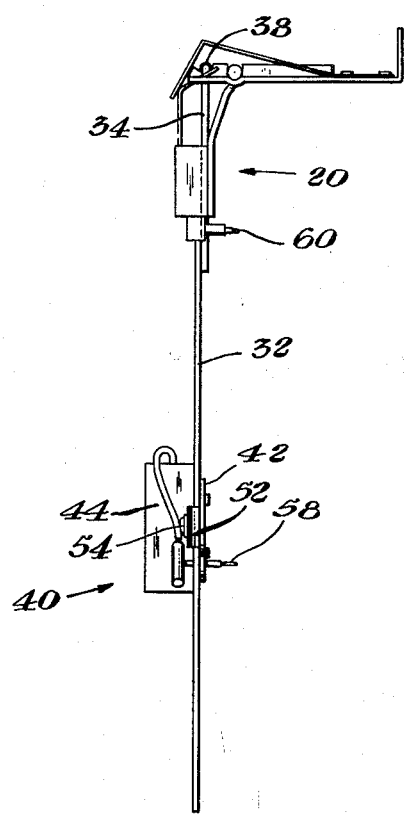
FIGURE 3 is a side elevation of the apparatus shown in FIGURE 2.
Figure 4:
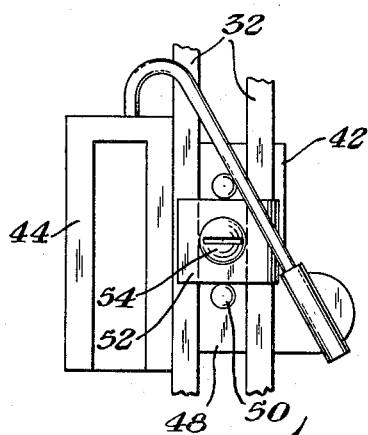
FIGURE 4 is an enlarged fragmentary front elevation of a portion of the apparatus shown in FIGURE 2.
Figure 5:
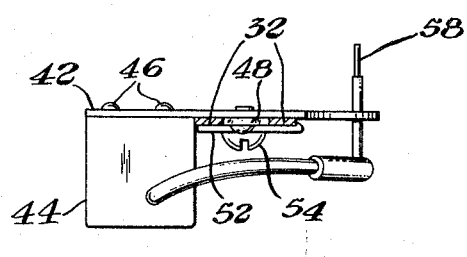
FIGURE 5 is a sectional view taken along the line 5—5 of FIGURE 2.

A trend detector similar to that shown in FIGURES 2 and 3 was attached to the pen of the recorder and positioned with respect to said pen so as to be in line and directly below said pen and at a distance of 0.6 inch from said pen.

In carrying out the test, the pipe was first filled with water. It was then coupled to the pressure pump through the fluid supply source and pressurizing was started. The rise in pressure of the pipe per unit time, as plotted by the recorder, was found to be linear up to an indicated pressure of about 670 pounds per square inch gage. This was indicated by comparing the slope of the line drawn by the second pen which was parallel to the present line drawn by the first pen, and which was located 0.6 inch below the line presently drawn by the first pen and ⅛ of an inch below the last previous line drawn by the first pen, with the slope of the last previous line drawn by the first pen which was identical. As this value was exceeded, the second pen drew a line whose slope deviated from the last previous line drawn by the first pen.

Various modifications can be made in the improved means and method of the instant invention without departing from the spirit or scope thereof. For example, it is obvious in view of the detailed description of the invention disclosed, that both pens may be slidably attached to the elongated member 30 which, in turn, may be attached to a drive assembly on the expanded scale-type recorder.

What is claimed is:

1. A mechanical device for visually detecting changes in the configuration of a line drawn on a moving chart by a pen whose movement is a function of one variable and in which the chart movement is a function of a second variable, comprising means for advancing the chart at a rate which is a function of said second variable, a first pen assembly and a second pen assembly, a drive mechanism for traversing the first and second pen of each said pen assemblies cyclically back and forth across said chart at a rate which is a function of said first variable to inscribe lines of identical configuration on said chart, and means for spacing said pens apart one from another by a distance which is at least approximately equal to the distance between two successive cyclically drawn lines made by the same pen, whereby the line inscribed by one of said pens is at least closely adjacent to the previously drawn line of the other pen and changes in configuration between successive lines may be detected visually by comparison of the two lines.

2. A mechanical device in accordance with claim 1 wherein said seond pen assembly is attached to an elongated member which is disposed perpendicularly to the direction of travel of said first pen by slidable attaching means and said elongated member having attaching means at one end adapted to affix said elongated member to said first pen assembly in a fixed positional relationship with respect to the tip of said first pen.

3. A mechanical device in accordance with claim 1 wherein said elongated member is comprised of two spaced apart bars disposed parallel to one another and joined together at least at the closed end, and said second pen assembly being slidably attached to the bars of said elongated member by means of slidable clamping means.

4. A mechanical device in accordance with claim 1 wherein each of said pen assemblies has at least one point.

References Cited in the file of this patent
UNITED STATES PATENTS

| | | |
|---|---|---|
| 1,269,525 | Craighead | June 11, 1918 |
| 2,639,964 | Keinath | May 26, 1953 |